Aug. 31, 1926.
G. P. RITTER ET AL
1,598,450
GAME CARDS
Filed Sept. 29, 1924     2 Sheets-Sheet 1
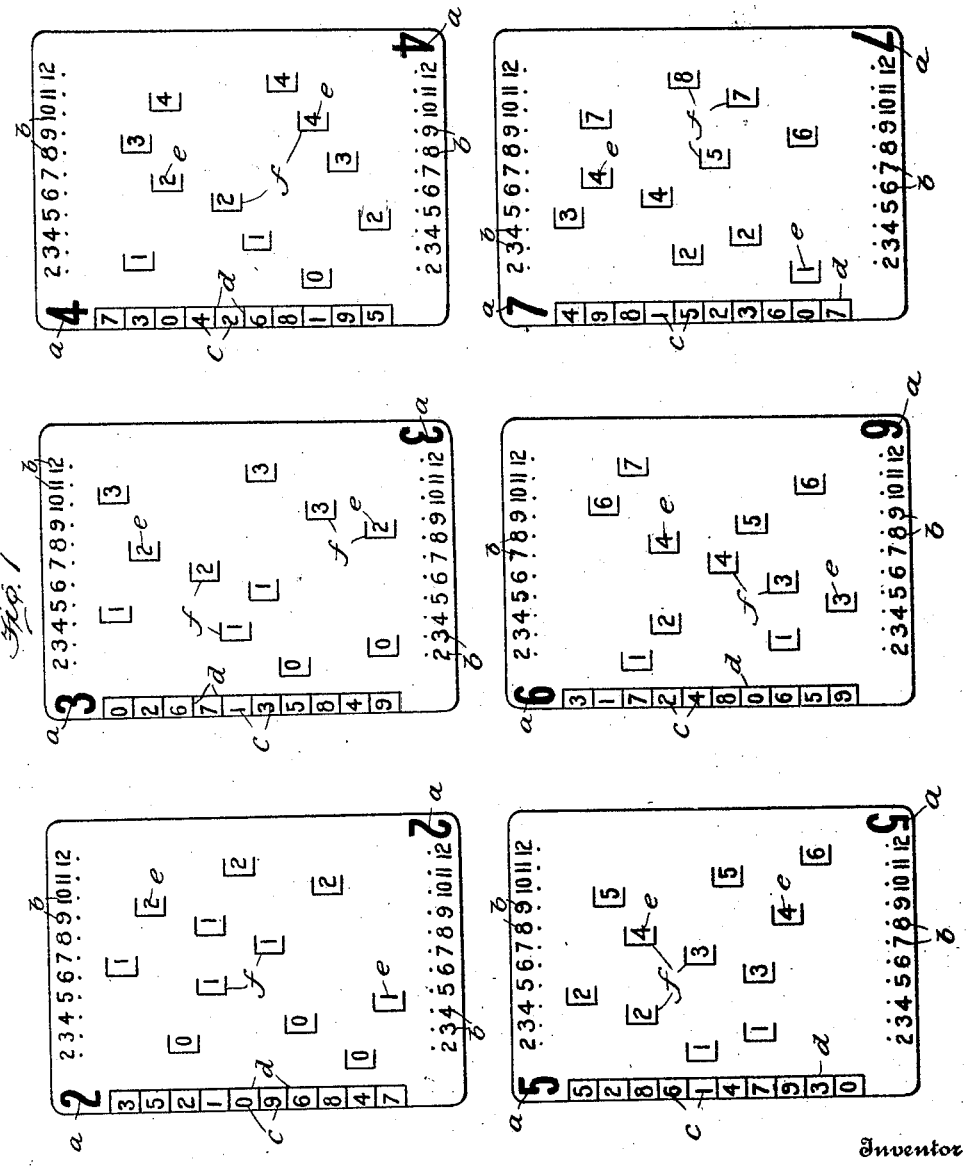

Aug. 31, 1926. 1,598,450
G. P. RITTER ET AL
GAME CARDS
Filed Sept. 29, 1924  2 Sheets-Sheet 2
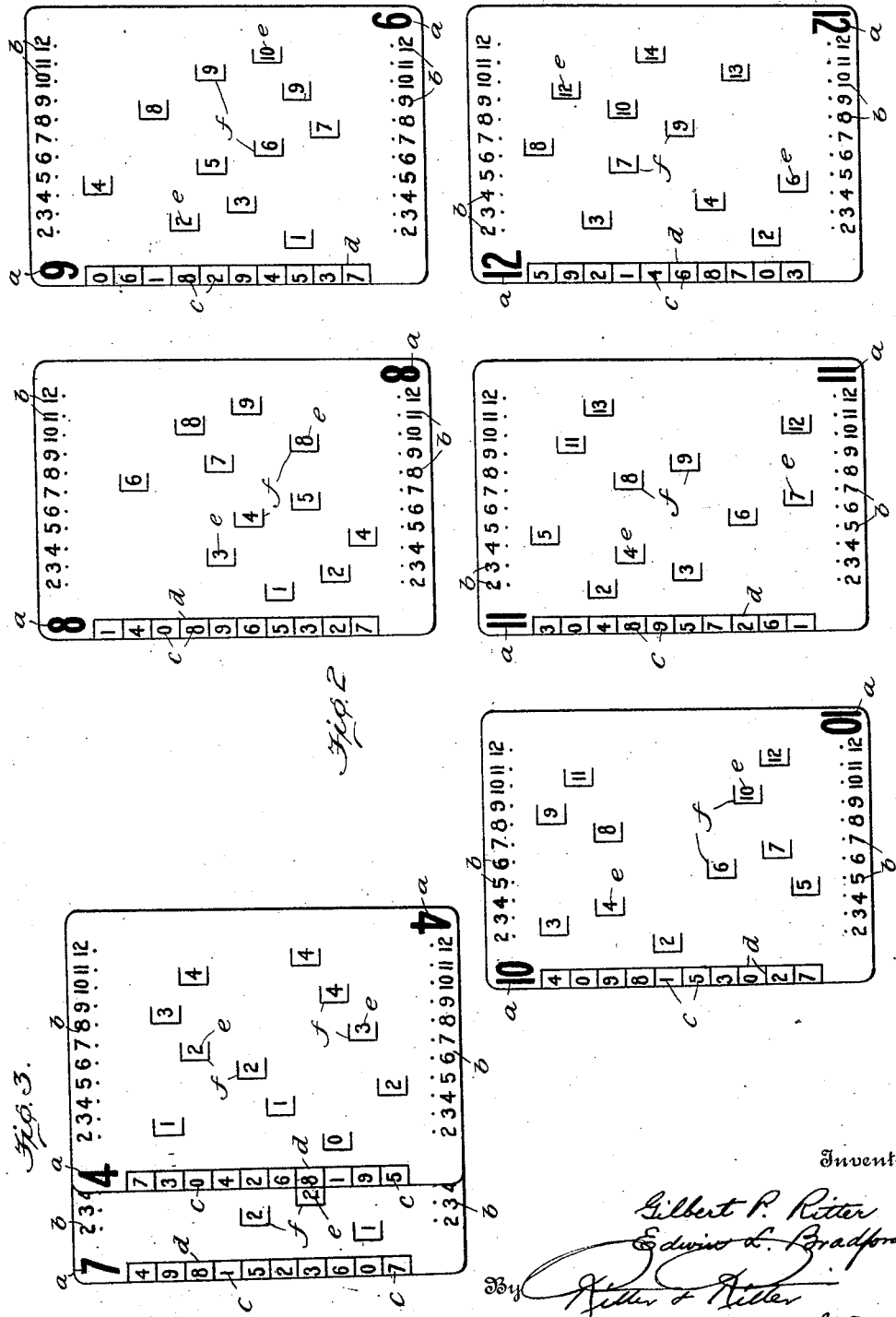

Patented Aug. 31, 1926.

1,598,450

UNITED STATES PATENT OFFICE.

GILBERT P. RITTER, OF WASHINGTON, AND EDWIN L. BRADFORD, OF TAKOMA PARK, DISTRICT OF COLUMBIA.

GAME CARDS.

Application filed September 29, 1924. Serial No. 740,546.

This invention relates to a set of game cards designed to enable speed and accuracy in the fundamental processes of arithmetic to be acquired by the playing of games in which the cards are used. The cards are designed not only for drill but also to teach the facts in the multiplication and division tables, when knowledge of these more difficult number-relations has not been acquired in advance. This is accomplished by the ease with which the beginner can instantly determine from the cards themselves the correct answer for any multiplication or for any fundamental problem of division, while the repeated occurrence throughout the play of all the various mutliplications from two times two up to twelve times twelve, together with the related division facts, ultimately fastens these number-relations, making them intimately familiarized material held ever ready for instant and automatic use.

The character of the cards is such that they easily lend themselves to the playing of games which are simple variations of the familiar card games universally played and enjoyed. The games played with the cards therefore achieve the three-fold advantage of possessing the interest inherent in the games upon which they are based, of being easily learned and of being desirably instructive.

The invention essentially consists in providing a set of cards each of which bears an index number together with a number forming a part of the answer to an arithmetical problem based on its index number and that of another card, the answer forming numbers on one card being complemental to those on other cards of the set.

Another feature of the invention consists in providing a set of cards wherein each card bears an index number together with a number forming a part of the answer to an arithmetical problem based on its index number and that of another card, the answer forming numbers on one card being complemental to those on other cards of the set, and each card bearing indicia constituting means for determining the appropriate complemental numbers to be read together to obtain the answer to the problem based on the index numbers of any two cards.

Other features of the invention will hereinafter appear and be particularly pointed out in the claims.

In the drawings illustrating a set of cards constructed in accordance with the invention for the purpose of teaching the facts in the multiplication and division tables:—

Figure 1 is a view displaying the faces of a group of cards forming part of a set of cards employing the invention, the cards of the group respectively bearing the index numbers 2, 3, 4, 5, 6 and 7.

Figure 2 is a similar view of the remaining cards of the illustrated set, said cards respectively bearing the index numbers 8, 9, 10, 11 and 12.

Figure 3 is a face view of two of the cards overlapped in proper relation for disclosing the product resulting from multiplying their index numbers.

The pack may advantageously consist of fifty-five cards, comprising five sets of eleven cards each. Such a pack, since it has approximately the same number of cards as contained in a pack of common playing cards, lends itself particularly well to the playing of games which are simple variations of the proper games played with ordinary playing cards.

In the particular embodiment of the invention illustrated in the drawings the index numbers $a$ of the cards of each set are consecutive from 2 to 12 and may be placed on the cards at diagonally opposite corners thereof. The pack thus contains five cards of each denomination, 2, 3, 4, 5, etc., cards bearing the index numbers 0 and 1 being omitted because the product resulting from multiplying 0 by any number is 0, and the product resulting from multiplying any number by 1 is the number itself.

Preferably arranged along the top and bottom edges of each card are two rows of "guide numbers" $b$, which may advantageously be printed in red and have adjoining corresponding dots. The guide numbers of each row read consecutively from 2 to 12 in the same direction, preferably from left to right. Disposed along an edge or margin of each card, preferably the left hand edge, is a column of "bordering numbers" $c$, which may be printed in black and each of which is preferably bounded on three sides by red "box lines" $d$ separating them from each other and from the numbers $e$ scattered over the body of the card, these latter "scattered numbers" preferably being in black in correspondence with the bordering numbers $c$. The scattered numbers $e$ are likewise bounded on three sides by red "box lines" $f$. The bordering numbers $c$ on each card are complemental to the scattered numbers $e$ on all the other cards, so that when any two cards are overlapped (see Fig. 3) on the line indicated by the appropriate guide numbers $b$ on the under card, there is formed at the left hand edge of the upper card a completely closed "box" made up from adjacent box lines $d$ and $f$ on the two cards. Within this box are embraced numbers appearing on both cards, one of said numbers being a bordering number $c$ and the other a number $e$ appearing on the body of the under card. When read together the two numbers in the closed box show the correct product due to multiplying the index number of one card by that of the other. Conversely, the index numbers on the two cards are the factors of the product appearing in the completed "box".

For the sake of symmetry it is preferred that the column of bordering figures $c$ on each card shall consist of ten numbers. It is, however, not necessary to have ten bordering numbers $c$ on each card. On those bearing the odd index numbers 3, 7, 9 and 11 all the numbers from 0 to 9, inclusive, are required; on the card having the index number 5 bordering numbers 0 and 5 alone are necessary; on those having the index number 10 the bordering number 0 need only be used; and on cards bearing even index numbers 2, 4, 6, 8 and 12 only even bordering numbers 2, 4, 6 and 8 together with 0 are required. The reason for this will be apparent upon noting that the bordering numbers $c$ at the left hand edge of the card occupy the units place in the answer showing the result of multiplying the index numbers of any two cards, and upon considering that the numbers 3, 7, 9 and 11 when multiplied by various numbers running consecutively from 2 to 12 produce products in which all the numbers from 0 to 9, inclusive, appear in the units place in the answer. Similarly when 5 is multiplied by any number the resulting answer ends either in 0 or in 5; when 10 is multiplied by any number the resulting answer ends in 0; and when 2, 4, 6, 8 or 12 is multiplied by any number the resulting answer ends either in 0, 2, 4, 6 or 8.

The card bearing the index number 10 preferably has among its bordering numbers $c$ two zeros. As either of these zeros may be read with complemental numbers $e$ on the other cards of the set to disclose the product resulting from multiplying any number by 10, the employment of a plurality of zeros on the 10 card permits a disposition of the numbers $e$ scattered on the bodies of the other cards which is less crowded than would be possible if a single bordering number 0 were employed on the 10 card.

The numbers $e$ scattered over the body of each card are in horizontal alinement with the respective numbers $c$ at the left hand edge of the card and are spaced horizontally so that they are out of vertical alinement, each number $e$ being so disposed that it stands immediately to the left of the line passing through two of the dots associated with the respective pairs of guide numbers 2—2, 3—3, 4—4, etc., along the top and bottom edges of the card. Thus it will be seen that when any two cards are overlapped so that the left hand edge of the upper one passes through the two dots corresponding to the index number of the upper card, the appropriate number $e$ which is to be read in conjunction with a bordering number $c$ of the uppermost card will appear immediately adjacent the left hand edge of the said upper card.

The arrangement of bordering numbers $c$ and scattered numbers $e$ appearing on the set of cards illustrated in the drawings is a desirable one in that it results in spacing the numbers $e$ advantageously; but it will be understood that the bordering numbers $c$ may be arranged in a different order which, of course, will result in corresponding changes in the positions of the scattered numbers $e$. In fixing the positions of the scattered numbers on a set of cards, the desired order of the bordering numbers $c$ upon any card may be established, after which this card may be successively overlapped in appropriate position on the other cards of the set and the positions of the various scattered numbers $e$ on those cards be suitably adjusted so as to read with the established bordering numbers. The position of the bordering and scattered numbers $c$ and $e$, respectively, of the other cards of the set may thereafter be obtained by similarly overlapping the various cards of the set with each other and marking thereon the required bordering and scattered numbers in their proper positions.

As the number-relations involved in multiplication are more difficult than those of division, the set of cards chosen for the purpose of illustrating the invention is based upon the fundamental problems of multiplication and division.

When in the course of any game it is necessary to "check" the result of multiplying any two of the index numbers of the cards, either card is placed on the other in such position that (see Fig. 3) their top and bottom edges match while the left hand margin of the upper card passes through the dots associated with the guide numbers $b$ on the lower card corresponding to the index number or denomination of the upper card. When thus positioned certain of the box lines $d$ and $f$ match on the two cards, and a single completely closed box or rectangle is formed at the left hand edge of the top card within which the correct answer appears. For example, if the result of multiplying 4 by 7 is to be "checked", the 4 card may be positioned on top of the 7 card, or vice versa. If the 4 card is placed on top, its left hand edge is alined with the dots corresponding to the guide numbers 4—4 at the upper and lower edges of the 7 card; if the 7 card is placed on top its left hand edge is alined with the guide numbers 7—7 on the 4 card. In either case, certain lines $d$ and $f$ on the two cards match at the left hand edge of the top card to complete a rectangular frame or box enclosing the correct answer "28", the number 2 being on one card and the number 4 being on the other.

Since the index numbers or denominations of any two properly overlapped cards are the factors of the number appearing in the closed rectangle formed by the box lines $d$ and $f$, the index number of either card accordingly gives the quotient resulting from dividing the number in the closed rectangular box by the index number of the other card. It thus is possible instantly to "check" the correctness of any player's statement as to the factors corresponding to the number appearing in the closed box of any two properly overlapped cards, and also to check the accuracy of his answer to the problem of dividing the number in the closed box by the index number of either of the overlapped cards.

For the purpose of illustrating the character of games which may be played with the cards, rules for two games are here set forth, one of said games being much like Casino and involving problems of multiplication, and the other being an adaptation of the well known game of Authors and involving problems of division.

*First game.*

The pack: Full pack of 55 cards.

Number of players: Two, three or four. (Partners, two against two.)

Dealing: Deal four cards to each player and four to table, two at a time in rotation, beginning with the player at the dealer's left. The cards to the table are dealt face up, just before the dealer serves himself. The remainder of the pack is left face down on the table, and after the first hand has been played, four more cards are dealt to each player as before; but none to the table. This continues until all of the cards have been dealt and played. Deal passes to the left.

*Object of the game.*

To score points by taking in certain cards and card combinations with counting value as follows:

"Cards" (greatest number of cards taken in) 3 points.

"Duros" (greatest number of cards taken in of denominations 7, 8 and 9) 2 points.

"Little Sixes" (four cards of denomination 6) 1 point.

"Big Sixes" (five cards of denomination 6) 2 points.

"Little Twelves" (four cards of denomination 12) 2 points.

"Big Twelves" (five cards of denomination 12) 4 points.

"Sweep" (taking in all cards on table) 1 point. (By agreement sweeps may not be counted.)

The play: Each player, beginning with the player immediately to the left of the dealer, may make any of the following plays:

(1) Take in a combination; i. e., if he holds a card in his hand in sequence with one on the table (or in sequence with two or more of the same denomination), he may play his card and take in both (or all such cards), provided he correctly announces at the time of playing his card the product resulting from multiplying the two cards together. If the card played from his hand is in sequence with two cards on the table of different denominations, one higher and the other lower than the card played, he may play his card and take in all three provided he correctly announces the products obtained by multiplying his card with each of the other two. Along with these three he may take in all others on the table of corresponding denominations. For example, one or more nines may be taken by either an 8 or a 10; if taken by an 8 the player should announce "72" (i. e. 8×9) on playing the card from his hand, and if taken by a 10 should say "90" (i. e. 10×9). Or one or more eights and one or more tens on the table may be taken by a 9 from the player's hand upon announcing "72" (i. e., 9×8) and "90" (i. e., 9×10). But any combination taken in by playing from the hand a card in sequence with one or more cards on the table must leave at least one card remaining on the table; that is to say, no "sweep" is permitted to be made by playing a card which is in sequence with all cards on the table.

If another player questions the correctness of any announced multiplication he says "check" and thereupon the player who has announced the multiplication must place the two cards in proper relation to enable the correct answer to be read by the player demanding the "check". If the multiplication has not been correctly stated, the erring player must leave both cards on the table.

(2) He may build a combination of two or more cards by adding a card from his hand to one or more cards on the table, provided he holds in his hand another card whose denomination is in sequence with the number representing the sum of such cards. On his next turn to play he may take in the "build" by playing a card of denomination in sequence therewith, provided no other player has taken it with a card in sequence with its sum, or has built higher on it, and provided also that the correct multiplication product is announced. Thus, if a 3 is on the board and the player holds a 5 and a 9, he can build his 5 on the 3, thus making 8, and can take it with the 9 on his next turn upon announcing the correct multiplication "72" (i. e., 9×8); or similarly, he could take in the build with a 7 upon announcing "56" (i. e., 7×8).

(3) He may call a combination; thus, if he holds a 7, along with either a 6 or an 8 and there is on the board another 7, or any combination of cards whose sum equals 7 (e. g., 5+2; or 4+3; or 3+2+2), he may play his 7 on all such cards on the board, calling the resulting assemblage "sevens"; and he (or any other player) may take them on his next turn by playing either a 6 or an 8, provided he correctly announces the result of the corresponding multiplication (for instance, the player announces "42" if the "sevens" are taken with a 6, and "56" if they are taken with an 8). If the announced multiplication is "checked" and proves to be incorrect the card with which the player attempted to take the called combination is forfeited and is placed face upward with any other cards which may be on the board. The forfeited card is never made a part of the called combination. While a build can be built higher, a call cannot, because the call contains more than one combination.

(4) A sweep is a card which takes in every card on the table at once. Sweeps are noted by facing one card of the combination in which the sweep is made.

(5) If a player cannot make any combination, he plays a single card face up to the board.

After pack is exhausted, last player taking in any combination also takes all cards remaining on the board, but taking the remaining cards in this way does not constitute a sweep.

Rules: A player cannot raise his own build, unless he has the cards to take in both the first build and the raised one.

A player may make a second build or a call, or may take in a combination, or capture another's build or call before taking in his first build or call, otherwise he must take in his first build or call at his next turn to play.

Cards once taken in cannot be examined, except the last combination won; nor points nor cards counted until all the cards have been played. A mistake in announcing a multiplication cannot be corrected after it has been questioned; nor can it be challenged after another combination has been taken in.

A card played out of turn must be withdrawn and held until the player's proper turn to play, when it must be played to the table. Player in error cannot combine it during that hand, or win any combination of cards with it. Any cards taken in with it by offending player must be restored to the table.

Builds may be raised with cards from the hand only; never with cards from the table. Builder or caller must announce the denomination of the build or call; otherwise any other player may separate the cards and use any of them.

A player taking in a card not belonging to his combination or build must restore it and all other cards in the combination or build to the table, and his own card is laid out separately from the others. If the combination was his own, the cards comprising it must be separated; if an opponent's, the combination must be left intact. A player taking in a combination with a wrong card, taking in a wrong combination or card not belonging to him must be challenged and the error proved before the next combination is taken in. If a player makes a build or a call without having in his hand the proper card to take it, he must upon discovery of the error break such combination, leaving the cards in separated relation on the table. Opponents' cards played after the error may be taken back and different cards played if opponents elect. If the build improperly made by one player has been taken by another player, there is no penalty nor any remedy.

Game: First player scoring 31 points wins. The points score out in the following order: Cards, duros, big twelves, big sixes, little twelves, little sixes, and sweeps.

Second game.

The pack: Full pack of 55 cards.
Number of players: From two to five.
Dealing: Deal nine cards to each player, one at a time, in rotation to the left, five face down and four face up, the first round being dealt face down and succeeding rounds alternately face up and face down. The remainder of the pack is placed in the center of the table face down. Deal passes to the left. Each player arranges his four exposed cards in a row before him face up, picking up the five other cards.

*Object of the game.*

The object of each player is to show before him on the table eight cards arranged in four pairs, each pair consisting of two cards of the same denomination.

The play: The dealer begins by holding up any two cards from his hand; he states the number resulting from multiplying their index numbers together, and demands of the next player to his left an answer to the problem of dividing the stated number by the index number of one of the cards. The denomination of the other card is the correct answer to the problem, and therefore the player's response can be "checked" immediately. For instance, the dealer, holding up a 7 and a 12 so that their backs are toward the player on his left, says: "84 by 7", meaning by this short form of expression "84 divided by 7 equals what"? The "dividend" 84 in this division problem is the result obtained by multiplying the denominations of the two cards together (that is, 7×12=84); while the "quotient" or correct answer is the denomination of the "12" card. If, on the other hand, the question asked on these two cards is "84 by 12" (that is, 84÷12=?), then the correct answer is the denomination of the "7" card.

If a player whose turn it is to act as questioner does not surely know the number resulting from multiplying the denominations of the two cards he desires to hold up, it is only necessary for him to hold the cards in proper overlapped relation, when he may instantly read the required number in the completely closed red "box" appearing at the left hand edge of the upper card.

(1) If the answer to the question is incorrect, the answering player forfeits for that turn the right to use a card from his hand to form a pair with one of his exposed cards; and he may not draw a card from the hand of any player or from the pack, or from the discard beside the pack, nor may he discard any card from his hand or from his exposed cards; but he shall immediately hold up two cards from his hand and ask the next player on his left a division question based upon them.

(2) If the answer given is incorrect, the questioner so indicates by stating the correct answer. Thus if the questioner says "63 by 7" (that is, 63÷7=?) and the player incorrectly answers "8", the questioner shall say "9". Should the answering player doubt that he has answered incorrectly, he may demand that the questioner "check" the two cards upon which the question was asked. The questioner then must show both cards and shall, if called upon to do so, arrange them in proper overlapped relation to permit the "dividend" used in the question to be "checked".

(3) If the question asked is not correctly based on the two cards which the questioner holds up, the answering player shall so declare by saying "error". The questioner shall then show and "check" the cards on which the question is asked. If the question proves not to be based on the cards, the answering player shall remove one card from any pair exposed before the questioner and shall place it in the discard; the questioner then draws a card from the pack and takes it into his hand. For instance, if the questioner, holding up a 9 and a 7, says "56 by 9" (instead of "63 by 9"), the answering player shall say "error", thus compelling the questioner to suffer the penalty of losing a card from any exposed pair he may have.

(4) If the answering player mistakenly claims "error" in a correct question, it shall be deemed the same as if an incorrect answer had been given.

(5) If the answer to the question is correct the answering player may: (*a*) either draw one card from the hand of any other player; or (*b*) draw a card from the top of the pack; or (*c*) draw a card from the discard. If a card is drawn from a player's hand he replaces it immediately, drawing a card from the top of the pack, or from the discarded cards beside the pack before the player who has drawn from him discards, thus being prevented from immediately taking back the card just drawn from him.

(6) After the player who has correctly answered has seen the card he has drawn, he may use it or any other card from his hand to form a pair with any card of the same denomination exposed before him and not already paired; or he may substitute for any one of his exposed cards the card he has drawn or any other that he holds. Only one pair can be formed at a time, and only one exposed card can be substituted for at a time. If a pair is formed, a card may not be substituted for an exposed card, and vice versa. In any case, the player must discard one card face down on the table beside the pack after having drawn a card. If he wishes to form an exposed pair, or wishes to replace one of his exposed cards with another, the player must not discard until after he has made the desired play, because by discarding he signifies that he either cannot or does not wish to form a pair or replace an exposed card, and thereupon his right to do so is forfeited. After discarding, the player shall hold up two cards from his hand and ask the next player on his left a division question based upon them.

(7) When the last card is drawn from the pack the discard is shuffled and formed into a new pack, which is placed down on the table and drawn from as before.

The play continues in this manner until one of the players has eight cards exposed on the table, combined in pairs.

Scoring: The first person to expose four pairs wins the game and scores one point for each exposed card remaining unpaired on the table. If the score is kept with chips (of which each player has an equal number to begin with) the winner collects from the other players according to the number of unpaired cards each has before him.

What is claimed is:—

1. A set of cards, each card bearing an index number together with a number forming a part of the answer to an arithmetical problem based on its index number and that of another card, the answer forming numbers on one card being complemental to those on other cards of the set.

2. A set of cards, each card bearing an index number together with a number forming a part of the answer to an arithmetical problem based on its index number and that of another card, the answer forming numbers on one card being complemental to those on other cards of the set, and each card bearing indicia for enabling any two cards to be overlappingly positioned so as to determine appropriate complemental numbers to be read together to obtain the answer to the problem based on the index numbers of the two cards.

3. A set of cards, each card bearing an index number together with a number forming a part of the answer to an arithmetical problem based on its index number and that of another card, the answer forming numbers on one card being complemental to those on other cards of the set, and each card bearing indicia constituting means for determining the appropriate complemental numbers to be read together to obtain the answer to the problem based on the index numbers of any two cards.

4. A set of cards, each card bearing an index number together with a plurality of numbers each respectively forming a complemental part of the product obtained by multiplying the index number of the card by the index number of another card of the set.

5. A set of cards, each card bearing an index number together with a plurality of numbers each respectively forming a complemental part of the product obtained by multiplying the index number of the card by itself or by the index number of another card of the set.

6. A set of cards, each card bearing an index number together with a plurality of numbers scattered over the body of the card and including a zero adjacent a margin of the card, the said zero on each card being adapted to be read in conjunction with one of the numbers on the body of another card to give the product resulting from multiplying the index numbers of the two cards.

7. A set of cards, each card bearing an index number together with a plurality of numbers arranged in two groups, the numbers of one group being arranged along a margin of the card and being adapted to be read in conjunction with numbers appearing on the other cards to give the product resulting from multiplying the index numbers of any two cards, said marginally arranged numbers on cards bearing odd index numbers other than the index number 5 including all numbers from 1 to 9, inclusive, and also a zero, and the marginally arranged numbers on the card bearing the index number 5 including a zero and 5.

8. A set of cards, each card bearing an index number together with a plurality of numbers arranged in two groups, the numbers of one group being arranged along a margin of the card and being adapted to be read in conjunction with numbers appearing on the other cards to give the product resulting from multiplying the index numbers of any two cards, said marginally arranged numbers on cards bearing even index numbers other than the index number 10 including the even numbers two, four, six and eight and also a zero.

9. A set of cards, each card bearing an index number together with a plurality of numbers arranged in two groups, the numbers of one group being arranged along a margin of the card and being adapted to be read in conjunction with numbers appearing on the other cards to give the product resulting from multiplying the index numbers of any two cards, and the said marginal numbers of the card bearing the index number 10 comprising a plurality of zeros.

10. A set of cards, each card bearing a plurality of numbers adapted when the card is overlapped in a predetermined relation with each of the other cards to be read in conjunction with numbers on the other cards to complete the answers to a system of arithmetical problems, each of said cards being provided with indicia for establishing the respectively proper overlapping positions of the other cards.

11. A set of cards, each card bearing an index number together with a plurality of numbers corresponding to the several index numbers borne by the cards of the set, said plurality of numbers providing means for indicating the proper relative position in which any two cards are to be placed to disclose the answer to an arithmetical problem based on the index numbers of the said two cards, and each card also carrying a plurality of numbers in addition to those heretofore mentioned, said last named numbers on each card being complemental to those on other cards of the set and forming with the latter the answers to arithmetical problems based on the index numbers of the cards.

12. A set of cards, each card bearing an index number together with a plurality of numbers arranged in two groups, the numbers of one group being scattered over the body of the card and those of the other group being arranged along a margin of the card and being adapted to be read in conjunction with said scattered numbers appearing on the other cards to give the answer to an arithmetical problem based on the index numbers of any two cards, the said scattered numbers and those along the margin of the card having indicia associated therewith constituting means for determining the appropriate numbers on any two cards which are to be read together to give the answer to an arithmetical problem based on the index numbers thereof.

13. A set of cards, each card bearing an index number, a plurality of oppositely disposed rows of numbers, the numbers in each row being arranged in the same order and corresponding to the several index numbers borne by the cards of the set, and a plurality of numbers arranged in two groups, the numbers of one of said groups being scattered over the body of the card and those of the other group being arranged in alignment along a margin of the card, the numbers in the said groups on each card being complemental to those in the said groups on other cards and forming with the latter the answers to arithmetical problems based on the index numbers of the cards.

14. A set of cards, each card bearing an index number, a plurality of rows of numbers arranged along opposite margins of the card, the numbers in each row being arranged in the same order and corresponding to the several index numbers borne by the cards of the set, a row of numbers bordering another margin of the card, and a plurality of numbers scattered over the body of the card, the said scattered numbers and those in said last named row on each card being complemental to numbers on other cards and forming therewith the answers to arithmetical problems based on the index numbers of the cards.

15. A set of cards, each card bearing an index number and a plurality of numbers arranged in two groups, the numbers in each group being complemental to numbers appearing on other cards and forming therewith the answers to arithmetical problems based on the index numbers of the cards, and the numbers in each group on each card being respectively associated with indicia which upon properly overlapping any two cards are adapted to mate with corresponding complemental indicia associated with the numbers in the groups on other cards so as to indicate the numbers on the two cards which are to be read together to give the answer to the arithmetical problem based on the index numbers of the two cards.

16. A set of cards, each card bearing an index character, a plurality of characters belonging to the same system and arranged in two groups, and a plurality of characters corresponding to the several index characters borne by the cards of the set and arranged to provide means for determining the proper overlapping relation of any two cards, the characters in either of said groups on each card being adapted to be read in conjunction with characters appearing in other groups on other cards of the set to complete the answer to problems involving the index characters of any two cards.

17. A plurality of cards each bearing an index number, each and every two of said cards bearing numbers adapted to be read together to give the product resulting from multiplying the index numbers of the two cards.

18. A set of cards, each card bearing an index number together with a plurality of numbers arranged in two groups, the numbers of one group being disposed along a margin of the card and those of the other group being scattered over the body of the card, the numbers in each group being adapted to be read in conjunction with numbers appearing on the other cards to give the product resulting from multiplying the index numbers of any two cards.

19. A set of cards, each card bearing an index number and a plurality of characters in addition thereto, said characters on each card being complemental to those on other cards and being adapted in conjunction with the latter to complete the answers to a set of arithmetical problems based on the index numbers of the cards.

In testimony whereof we affix our signatures.

GILBERT P. RITTER.
EDWIN L. BRADFORD.